(12) United States Patent
Watson et al.

(10) Patent No.: US 9,523,238 B2
(45) Date of Patent: *Dec. 20, 2016

(54) METHOD OF USING A MUD MOTOR

(71) Applicant: Thru Tubing Solutions, Inc., Oklahoma City, OK (US)

(72) Inventors: Brock Watson, Oklahoma City, OK (US); Gregory Kliewer, Edmond, OK (US); Roger L. Schultz, Newcastle, OK (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,934

(22) Filed: Apr. 24, 2014

(65) Prior Publication Data
US 2015/0167386 A1 Jun. 18, 2015

Related U.S. Application Data

(63) Continuation of application No. 14/104,276, filed on Dec. 12, 2013, now Pat. No. 8,752,647.

(51) Int. Cl.
*E21B 4/00* (2006.01)
*E21B 4/02* (2006.01)
*F16C 19/30* (2006.01)
*F16D 3/24* (2006.01)
*F16D 3/221* (2006.01)
*E21B 44/00* (2006.01)
*F03B 13/02* (2006.01)

(52) U.S. Cl.
CPC ............... *E21B 4/02* (2013.01); *E21B 4/003* (2013.01); *E21B 44/005* (2013.01); *F03B 13/02* (2013.01); *F16C 19/305* (2013.01); *F16D 3/221* (2013.01); *F16D 3/24* (2013.01)

(58) Field of Classification Search
CPC ............ E21B 4/02; E21B 7/068; E21B 4/003; E21B 44/00; E21B 44/005; E21B 21/08
See application file for complete search history.

(56) References Cited

U.S. PATENT DOCUMENTS

| 1,334,266 | A | * | 3/1920 | Simmons ..................... 384/623 |
| 4,665,997 | A |  | 5/1987 | Maurer et al. |
| 4,904,228 | A | * | 2/1990 | Frear et al. .................. 464/152 |
| 5,248,204 | A |  | 9/1993 | Livingston et al. |
| 5,956,995 | A |  | 9/1999 | Herben et al. |
| 6,073,708 | A |  | 6/2000 | Brown et al. |
| 6,416,225 | B1 |  | 7/2002 | Cioceanu et al. |

(Continued)

FOREIGN PATENT DOCUMENTS

WO WO2012158087 A1 11/2012

OTHER PUBLICATIONS

International Search Report and Written Opinion; PCT/US2014/059136; dated Jan. 19, 2015; 15 pages.

*Primary Examiner* — Nicole Coy
(74) *Attorney, Agent, or Firm* — Hall Estill Law Firm

(57) ABSTRACT

This application is directed to methods of using pressure balanced mud motors. The mud motor includes a power section to rotate a passageway housing and propel fluid through a passageway disposed in the passageway housing. The mud motor can also include a roller bearing assembly and a drive shaft assembly to improve the life and efficiency of the pressure balanced mud motor.

16 Claims, 6 Drawing Sheets

(56) References Cited

U.S. PATENT DOCUMENTS

| | | |
|---|---|---|
| 6,561,290 B2 | 5/2003 | Blair et al. |
| 6,827,160 B2 | 12/2004 | Blair et al. |
| 7,500,787 B2 | 3/2009 | Cioceanu |
| 8,511,906 B2 | 8/2013 | Marchand |
| 2012/0177308 A1 | 7/2012 | Marchand |
| 2013/0228381 A1 | 9/2013 | Yambao et al. |
| 2014/0037232 A1 | 2/2014 | Marchand |

* cited by examiner

US 9,523,238 B2

METHOD OF USING A MUD MOTOR

CROSS-REFERENCE TO RELATED APPLICATIONS

The present application is a continuation application of U.S. patent application having U.S. Ser. No. 14/104,276, filed Dec. 12, 2013, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present invention relates to a mud motor used in oil and gas operations that is pressure balanced.

2. Description of the Related Art

Standard sealed mud motors typically have radial bearings/assemblies that are exposed to well bore fluids. The fluid that operates the sealed mud motor must pass across the bearing assemblies and out of the sealed mud motor. Typically, the bearing assemblies have seals that prevent pumped fluid from contaminating any grease or oil used in the bearing assemblies. As fluid flows through the sealed mud motor and across the seals and bearing assemblies, a pressure drop occurs between upper and lower seals associated with the bearing assemblies due to the friction loss associated with fluid flowing through the sealed mud motor. This pressure drop can cause the seals to leak, allowing drilling fluid to enter the bearing assemblies and cause premature failure of the bearing assemblies.

Accordingly, there is a need for a sealed mud motor that can balance the pressure drop across the seals/bearing assemblies caused by the friction of the fluid flowing through the sealed mud motor.

SUMMARY OF THE DISCLOSURE

The present disclosure is directed to a method of using a pressure balanced mud motor. The mud motor includes an outer housing having an upper portion and a lower portion and a power section disposed within the housing for rotating a passageway housing in response to fluid flow through the power section. The mud motor also includes a passageway disposed in the passageway housing where a small fluid volume is created between the passageway housing and the outer housing and a bearing assembly for facilitating the rotation of the passageway housing. Furthermore, the mud motor includes a hydraulic apparatus for balancing a pressure drop experienced across the bearing assembly due to frictional flow of fluid through the passageway.

The present disclosure is also directed to a method of using a pressure balanced mud motor that includes a power section disposed within a housing for rotating a passageway housing, the power section having a rotor and a drive shaft assembly. The drive shaft assembly of the mud motor includes a shaft having a first end and a second end for transferring rotation of the rotor to the passageway housing, the first end having a depression slot disposed thereon and a socket element supported by the rotor and adapted to receive the first end of the shaft. The drive shaft assembly also includes at least one elongated pin having a first end and a second end, the first end disposed in at least one pin opening in the socket element and the second end engaging the depression slot disposed on the first end of the shaft.

The present disclosure is also directed to a method of using a a pressure balanced mud motor that includes a roller bearing. The roller bearing of the mud motor includes a roller cage having an inner ring, a plurality of extension elements extending therefrom and an outer edge, each pair of adjacent extension elements cooperating to form a plurality of bearing seats and a plurality of rollers disposed in each bearing seat. The roller bearing also includes a retaining ring disposed around the outer edge of the roller cage to maintain the rollers in the bearing seats, the retaining ring and the outer edge of the roller cage having a tapered interface.

DETAILED DESCRIPTION OF THE DISCLOSURE

Figure 1:
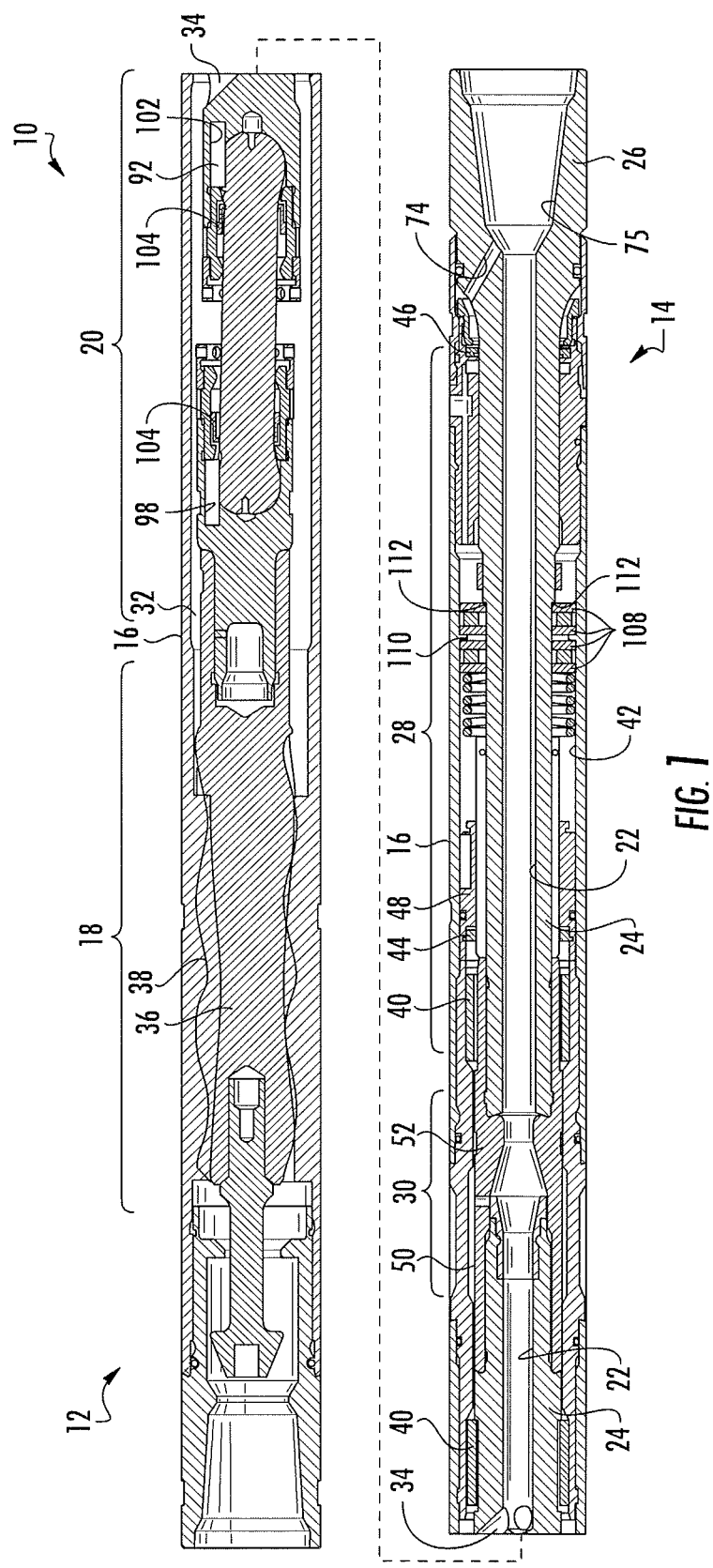
FIG. 1 is a cross-sectional view of a downhole mud motor constructed in accordance with the present disclosure.

The present disclosure relates to a mud motor 10 used in downhole oil and gas operations that substantially reduces a pressure drop (or pressure differential) across the portions of the mud motor 10 caused by the friction of fluid (e.g., mud, drilling fluid, drilling mud, etc.) flowing therethrough. The present disclosure is also directed to a method of using this mud motor while maintaining a substantially balanced pressure drop across various portions of the mud motor. Shown in FIG. 1, the mud motor 10 includes an upper portion 12, a lower portion 14 and a housing 16 for encapsulating various parts of the mud motor 10.

The upper portion 12 includes a power section 18 for driving/forcing the fluid through the mud motor 10 and rotating the various parts of the mud motor 10 encapsulated in the housing 16 and a drive shaft assembly 20 for transferring the rotation produced by the power section 18 to other components disposed in the lower portion 14 of the mud motor 10.

The lower portion 14 of the mud motor 10 includes a passageway 22 and passageway housing 24 disposed therethrough to transfer fluid driven from the power section 18 out of a lower end 26 of the mud motor 10, a bearing assembly 28 for facilitating the rotation of the passageway housing 24 and a hydraulic apparatus 30 for reducing the pressure drop across the passageway 22 and the bearing assembly 28. Fluid is passed from the power section 18 into an upper annulus area 32 in the upper portion 12 of the mud motor 10. The fluid is then transported into the passageway 22 from the upper annulus area 32 via a conduit 34 disposed in the passageway housing 24.

The power section 18 can be any device known in the art for driving fluid through the mud motor 10 and rotating various components in the mud motor 10. In one embodiment, the power section 18 can include a rotor 36 and stator 38 that operate as a moineau-type motor. The rotor 36 in a moineau-type motor rotates and orbits within the stator 38. The drive shaft assembly 20 is adapted to compensate for the orbiting and rotating motion of the rotor 36 within the power section 18 and transfer only the rotating motion to the passageway housing 24 in the lower portion 14 of the mud motor 10.

In one embodiment, the bearing assembly 28 includes at least one bearing 40 for facilitating the rotating of the passageway housing 24, a lubrication fluid housing 42 for containing a lubricating fluid supply for use with the mud motor 10, and a first sealing element 44 disposed adjacent to one end of the lubrication fluid housing 42 and a second sealing element 46 disposed adjacent to the other end of the lubrication fluid housing 42. The sealing elements 44 and 46 prevent drilling fluid from entering the lubrication fluid housing 42 and lubrication fluid from exiting the lubrication fluid housing 42. In another embodiment, the bearing assembly 28 includes a floating piston 48 to eliminate pressure drop across the bearing assembly 28 due to hydrostatic pressure.

The pressure drop generated across the bearing assembly 28 and/or the passageway 22 from the friction of the fluid passing through the passageway 22 can be high enough such that the sealing elements 44 and 46 can leak or wear excessively. The pressure drop can allow drilling fluid to enter the lubrication fluid housing 42 or allow lubricating fluid to exit the lubrication fluid housing 42. Either one of these potential occurrences can be detrimental to the operation of the mud motor 10.

The lower portion 14 of the mud motor 10 includes a small annulus area 50 disposed between the passageway housing 24 and the housing 16 where a small fluid volume is created. The small annulus area 50 can contain small amounts of fluid that has leaked off from the fluid that flows from the upper annulus area 32, through the conduit 34 and into the passageway 22. The small amount of fluid in the small annulus area 50 is in fluid communication with the first sealing element 44. Due to the fluid communication between the small annulus area 50 and the first sealing element 44, the first sealing element 44 is exposed to pressure equivalent to the pressure drop generated across the bearing assembly 28 and the passageway 22. The pressure drop can be either measured or determined based upon the length and size (diameter) of the passageway 22 and the desired flow rate of fluid to be passed through the mud motor 10.

Figure 2A:
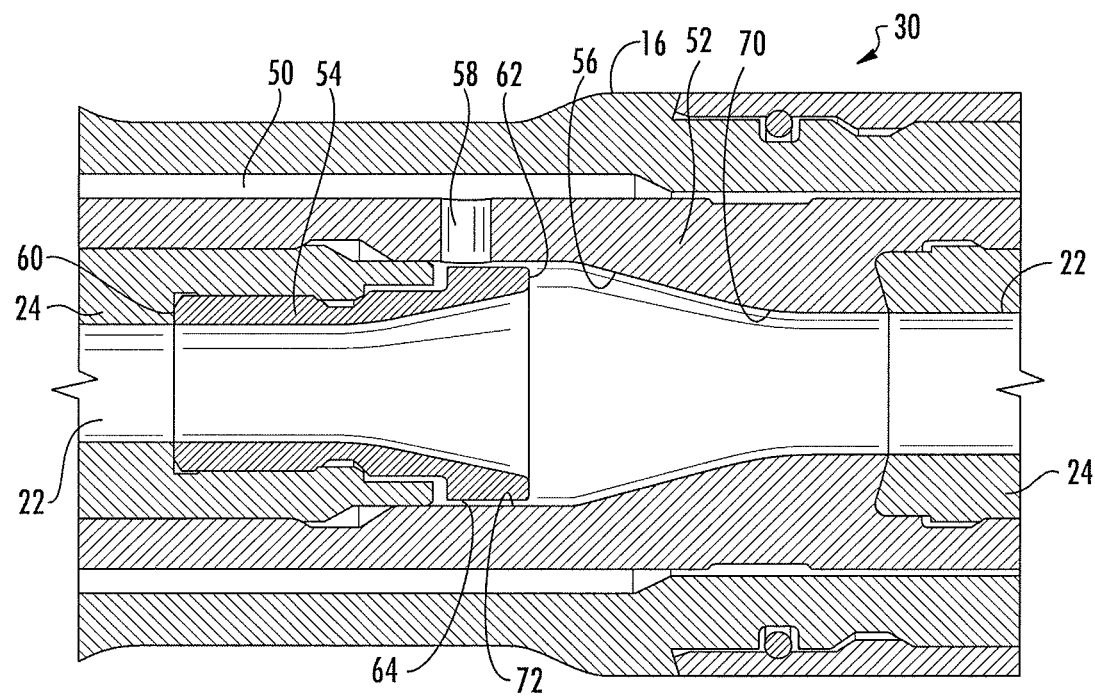
FIG. 2A is a cross-sectional view of a portion of the downhole mud motor constructed in accordance with the present disclosure.
Figure 2B:
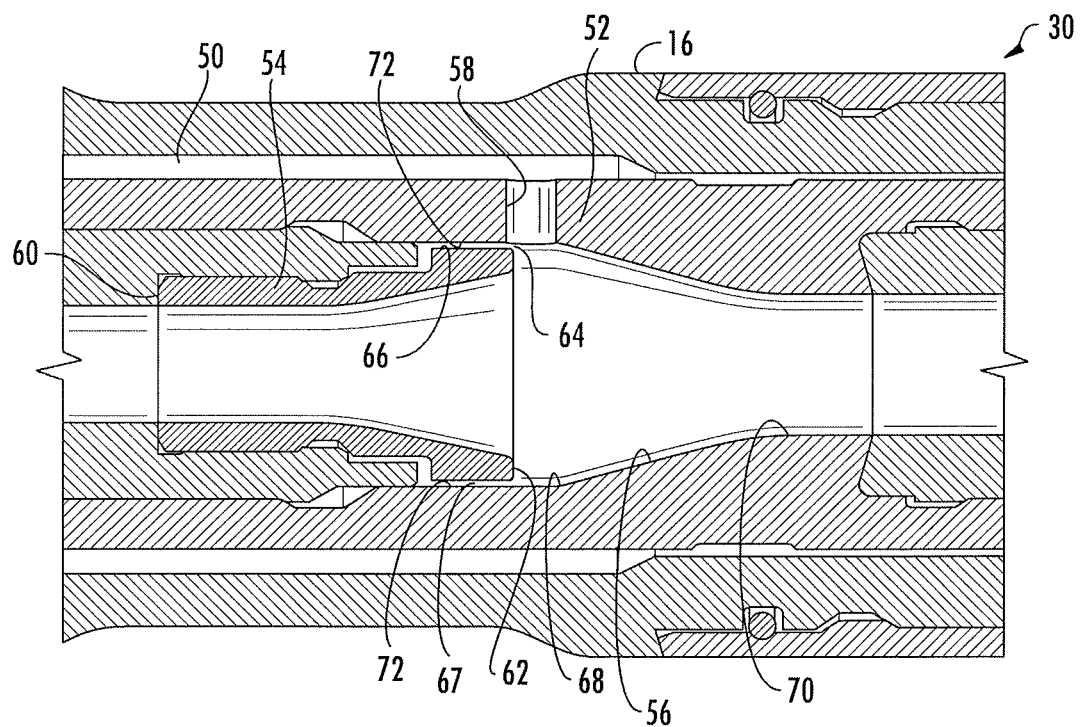
FIG. 2B is a cross-sectional view of another embodiment of a portion of the downhole mud motor constructed in accordance with the present disclosure.

Shown in more detail in FIGS. 2A and 2B, the hydraulic apparatus 30 can be any device, or combination of devices that can hydraulically negate, or substantially negate, the pressure experienced by the first sealing element 44 due to the pressure drop generated from the friction of the fluid flowing through the passageway 22. In one embodiment, the hydraulic pressure drop across the bearing assembly 28 (or other parts of the mud motor) due to friction of the fluid flowing through the passageway 22 is less than about 25 psi. In another embodiment, the hydraulic pressure drop across the bearing assembly 28 (or other parts of the mud motor) due to friction of the fluid flowing through the passageway 22 is less than about 5 psi. In yet another embodiment, the hydraulic pressure drop across the bearing assembly 28 (or other parts of the mud motor) due to friction of the fluid flowing through the passageway 22 is less than about 0 psi.

In one embodiment, the hydraulic apparatus 30 includes a housing 52 disposed within the passageway housing 24, a nozzle 54 disposed within the housing 52 and in fluid communication with the passageway 22, a diffusing element 56 disposed adjacent to the nozzle 54 and a port 58 disposed in the housing 52 which fluidically connects the small annulus area 50 with other components of the hydraulic apparatus 30.

The nozzle 54 includes a first end 60 in fluid communication with the passageway 22 and a second end 62 in fluid communication with the diffusing element 56. The nozzle 54 has a cross-sectional area (the cross-sectional area referred to herein for the nozzle 54 is perpendicular to the direction of the flow of fluid through the nozzle 54 and the passageway 22) that increases (divergent) or decreases (convergent) across a portion of the nozzle 54 in the direction toward the lower end 26 of the mud motor 10. In one embodiment, the cross-sectional area of the nozzle 54 is substantially circular-shaped. The amount the cross-sectional area of the nozzle 54 increases or decreases over a given length of the nozzle 54 can be predetermined and designed based upon the size of the mud motor 10 and the flow rate of fluid passing through the mud motor 10. Additionally, the beginning and ending cross-sectional area of the nozzle 54 can be predetermined and designed based upon the flow rate of fluid through the mud motor 10 and the size of the mud motor 10. Furthermore, the nozzle 54 is designed and sized responsive to the differential pressure across the bearing assembly 28 and the first and second sealing members 44 and 46 caused by the frictional flow of the fluid through the passageway 22.

In another embodiment, the nozzle 54 includes an annulus 64 disposed between an outside portion 66 of the nozzle 54 and an inner portion 67 of the housing 52. The annulus 64 is in fluid communication with the port 58 and the diffusing element 56. The annulus 64 allows fluid drawn from the small annulus area 50 to be pulled/pushed into the diffusing element 56 without disrupting the flow from the passageway 22 into the nozzle 54. In another embodiment, the port 58 can be disposed in the housing 52 such that the port 58 is in fluid communication with the small annulus area 50 and the diffusing element 56.

The port 58 can be shaped, sized and designed to work with the other components of the hydraulic apparatus 30 so that the fluid in the small annulus area 50 is pulled therefrom at a rate that reduces the pressure on the first sealing element 44 an amount that is substantially equal to the pressure drop across the bearing assembly 28 due to the friction of the fluid flowing through the passageway 22.

The diffusing element 56 includes a first end 68 in fluid communication with the nozzle 54 and a second end 70 in fluid communication with the passageway 22. The diffusing element 56 can have a cross-sectional area (the cross-sectional area referred to herein for the diffusing element 56 is perpendicular to the direction of the flow of fluid through the diffusing element 56 and the passageway 22) that is convergent, divergent and/or substantially constant across portions of the diffusing element 56. In one embodiment, the cross-sectional area of the diffusing element 56 is substantially circular-shaped. The amount the cross-sectional area of the diffusing element 56 decreases or increases over a given length of the diffusing element 56 can be predetermined and designed based upon the size of the mud motor 10 and the flow rate of fluid passing through the mud motor 10. Additionally, the beginning and ending cross-sectional area of the diffusing element 56 for a preselected length of the diffusing element 56 can be predetermined and designed based upon the flow rate of fluid through the mud motor 10 and the size of the mud motor 10. Furthermore, the diffusing element 56 is designed and sized responsive to the differential pressure across the bearing assembly 28 and the first and second sealing members 44 and 46 caused by the frictional flow of the fluid through the passageway 22.

In one embodiment, the first end 68 of the diffusing element 56 is substantially the same size as the second end 62 of the nozzle 54. In another embodiment, the first end 68 of the diffusing element 56 has substantially the same diameter of an outer portion 72 of the annulus 64 disposed about the nozzle 54. Thus, the second end 62 of the nozzle 54 is smaller in size than the first end 68 of the diffusing element 56. The depth of the annulus 64 (i.e., the difference in the radius of the second end 62 of the nozzle 54 and the radius of the first end 68 of the diffusing element 56) can be designed based upon the flow rate of the fluid through the mud motor 10 and the size of the other components (nozzle, diffuser element, passageway, etc.) in the mud motor 10.

In another embodiment of the present disclosure, a hole 74 (or fluid passage) is disposed in the passageway housing 24 that fluidically connects a lower portion 75 of the passageway 22 with the second sealing member 46 (or downhole side of the bearing assembly 28) of the bearing assembly 28. The hole 74 allows the second sealing element 46 to experience the same fluid pressure as the first sealing element 44 with the exception of the frictional pressure drop across the bearing assembly 28 due to the fluid flowing through the passageway 22.

Fluid flow through the nozzle 54 causes the pressure in port 58 to decrease relative to the rate of flow of the fluid through the nozzle 54. The diameter of the nozzle 54 is sized to a value that will cause the pressure of the fluid in port 58 to be substantially equal to the pressure of the fluid in hole 74. When the pressure of the fluid in port 58 and the pressure of the fluid in hole 74 are substantially equal, then the differential pressure across the bearing assembly 28 and the first and second sealing elements 44 and 46 is balanced.

Figure 3:
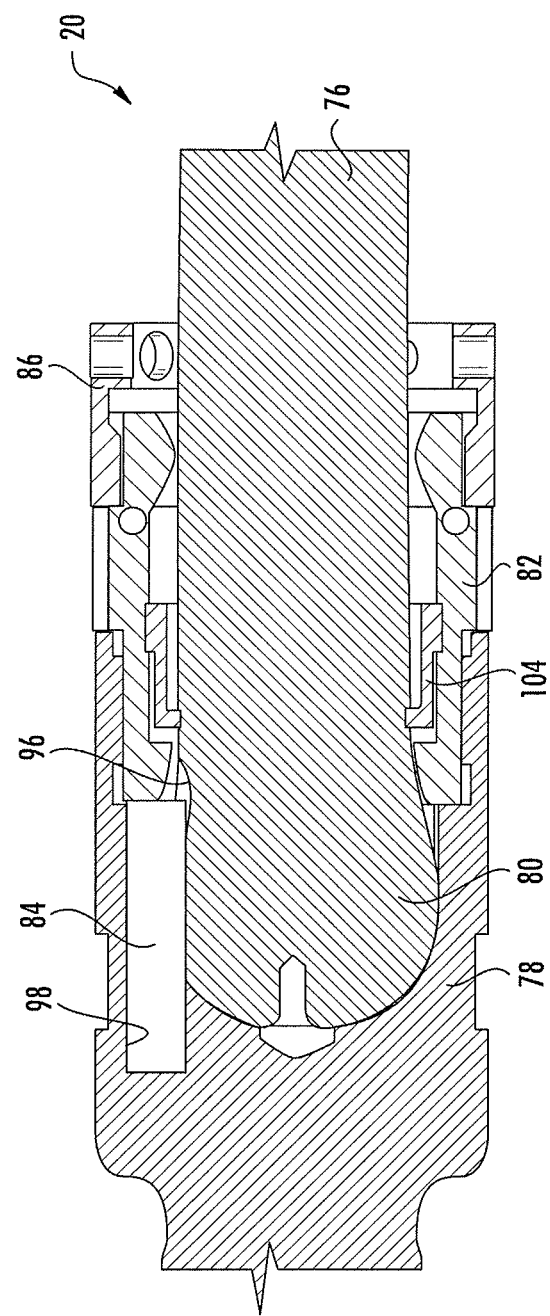
FIG. 3 is a cross-sectional view of another portion of the downhole mud motor constructed in accordance with the present disclosure.
Figure 4:
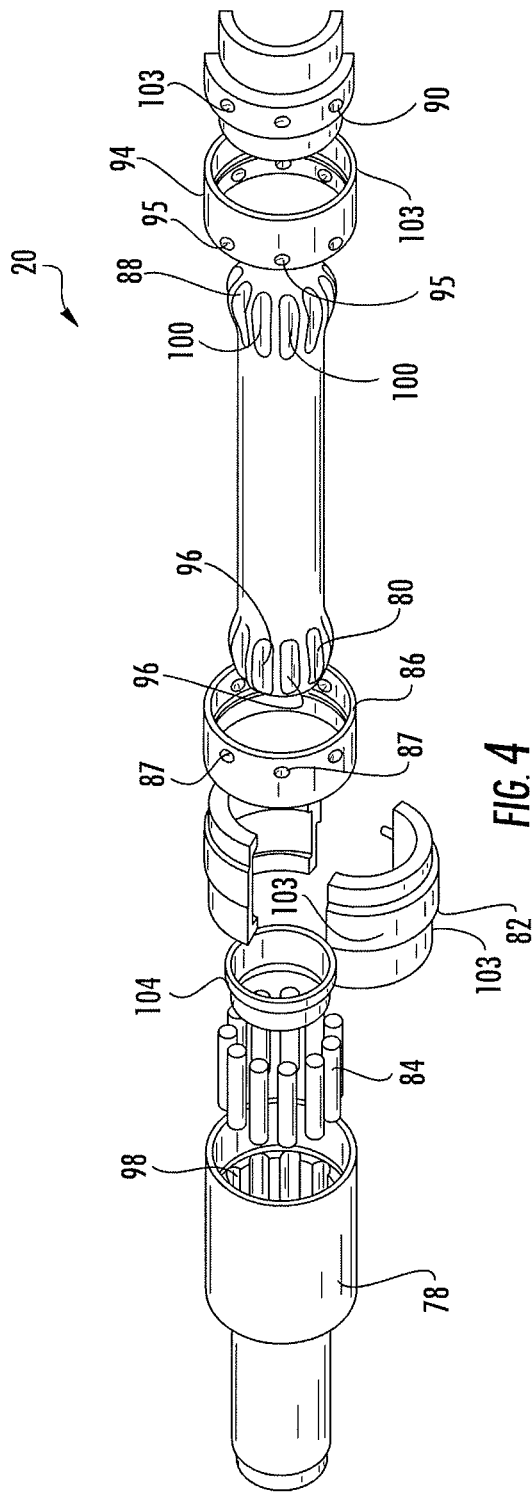
FIG. 4 is an exploded view of a portion of the downhole mud motor constructed in accordance with the present disclosure.

In yet another embodiment of the present disclosure shown in FIGS. 3-4, the drive shaft assembly 20 includes a shaft 76 for transferring the rotation of the rotor 36 to the passageway housing 24, a socket element 78 connected to the rotor 36 (or connected to other components connected to the rotor 36) for receiving a first end 80 of the shaft 76 and a connector 82 disposed at least partially around the shaft 76 and supported by (or connected to) the socket element 78 for assisting in the retention of the shaft 76 in the socket element 78. The drive shaft assembly 20 also includes at least one pin element 84 for engaging the socket element 78 and the shaft 76 to assist in the transfer of rotation of the rotor 36 to the shaft 76. The drive shaft assembly 20 can also include a retaining element 86 disposed around the shaft 76 and adjacent to the connector 82 to secure the connector 82. The retaining element 86 can also include openings 87 disposed therein to permit access to tools to allow assembly and disassembly of the drive shaft assembly 20.

In another embodiment, the shaft 76 of the drive shaft assembly 20 also includes a second end 88 that can be connected to the passageway housing 24 to rotate the passageway housing 24. The drive shaft assembly 20 can also include a second connector 90 disposed at least partially around the shaft 76 and supported by (or connected to) the passageway housing 24 and at least one second pin element 92 for engaging the passageway housing 24 and the second end 88 of the shaft 76 to assist in the transfer of rotation of the shaft 76 to the passageway housing 24. The drive shaft assembly 20 can also include a second retaining element 94 disposed around the shaft 76 and adjacent to the second connector 90 to secure the second connector 90. The retaining element 94 can also include openings 95 disposed therein to permit access to tools to allow assembly and disassembly of the drive shaft assembly 20.

In one embodiment, each end 80,88 of the shaft 76 is oversized such that the ends 80,88 cannot fit through the connectors 82,90. In one embodiment, the ends 80,88 have a spherical shape, cubic shape, etc., though the ends 80,88 are not limited to any specific type of shape. In yet another embodiment, the end 80 includes at least one depression slot 96 disposed therein for engaging the pin elements 84. The depression slot 96 can be disposed on the side of each end 80,88 of the shaft 76. The pins 84 can be elongated and extend past the first end 80 of the shaft 76 and engage holes 98 disposed in the socket element 78. The pin elements 84 engage the depression slots 96 and force the shaft 76 to turn as the rotor 36 turns the socket element 78. The elongated pin elements 84 and the depression slots 96 permit the shaft 76 to be easily removed from the socket element 78 to repair various portions of the drive shaft assembly 20.

Similarly, the end 88 includes at least one depression slot 100 disposed therein for engaging the second pin elements 92. The pins 92 can be elongated and extend past the second end 88 of the shaft 76 and engage holes 102 disposed in the passageway housing 24. The second pin elements 92 engage the depression slots 100 and force the passageway housing 24 to turn as the rotor 36 ultimately turns the shaft 76. The elongated second pin elements 92 and the depression slots 100 permit the shaft 76 to be easily removed from the passageway housing 24 to repair various portions of the drive shaft assembly 20.

Figure 5:
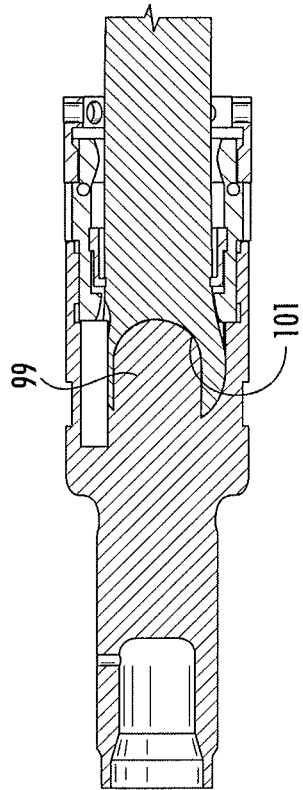
FIG. 5 is a cross-sectional view of another embodiment of a portion of the downhole mud motor constructed in accordance with the present disclosure.

In another embodiment shown in FIG. 5, the socket element 78 can have an extension element 99 protruding from a central area to mate with an opening 101 disposed in the first end 80 of the shaft 76.

In a further embodiment, the connectors 82 and 90 can be constructed of multiple parts. For example, the connectors 82,90 can each have a first piece and a second piece that are connectable around the shaft 76 once the first end 80 and the second end 88 of the shaft 76 is disposed in the socket element 78 and the passageway housing 24, respectively. The connectors 82,90 being constructed of multiple parts permits the ends 80,88 of the shaft 76 to be oversized and permits easy access to the shaft 76 and other components of the drive shaft assembly 20 for repair. Thus, the ends 80,88 can be set in the socket element 78 and the passageway housing 24, respectively, and the connectors 82,90 disposed around the shaft 76. In one embodiment, each connector 82,90 is constructed of two pieces and includes at least one opening 103 disposed therein to allow access to the drive shaft assembly 20 for assembly and disassembly.

The connector 82 can also be threaded on each end to engage the socket element 78 and the retaining element 86. Similarly, the connector 90 can be threaded on each end to engage the passageway housing 24 and the second retaining element 94. The drive shaft assembly 20 can also include at least one sealing element 104 disposed about the shaft 76. In one embodiment, the sealing element 104 can be disposed around the shaft 76 and inside of the connector 82. Similarly, another sealing element 104 can be disposed around the shaft 76 and inside the connector 90.

Figure 6:
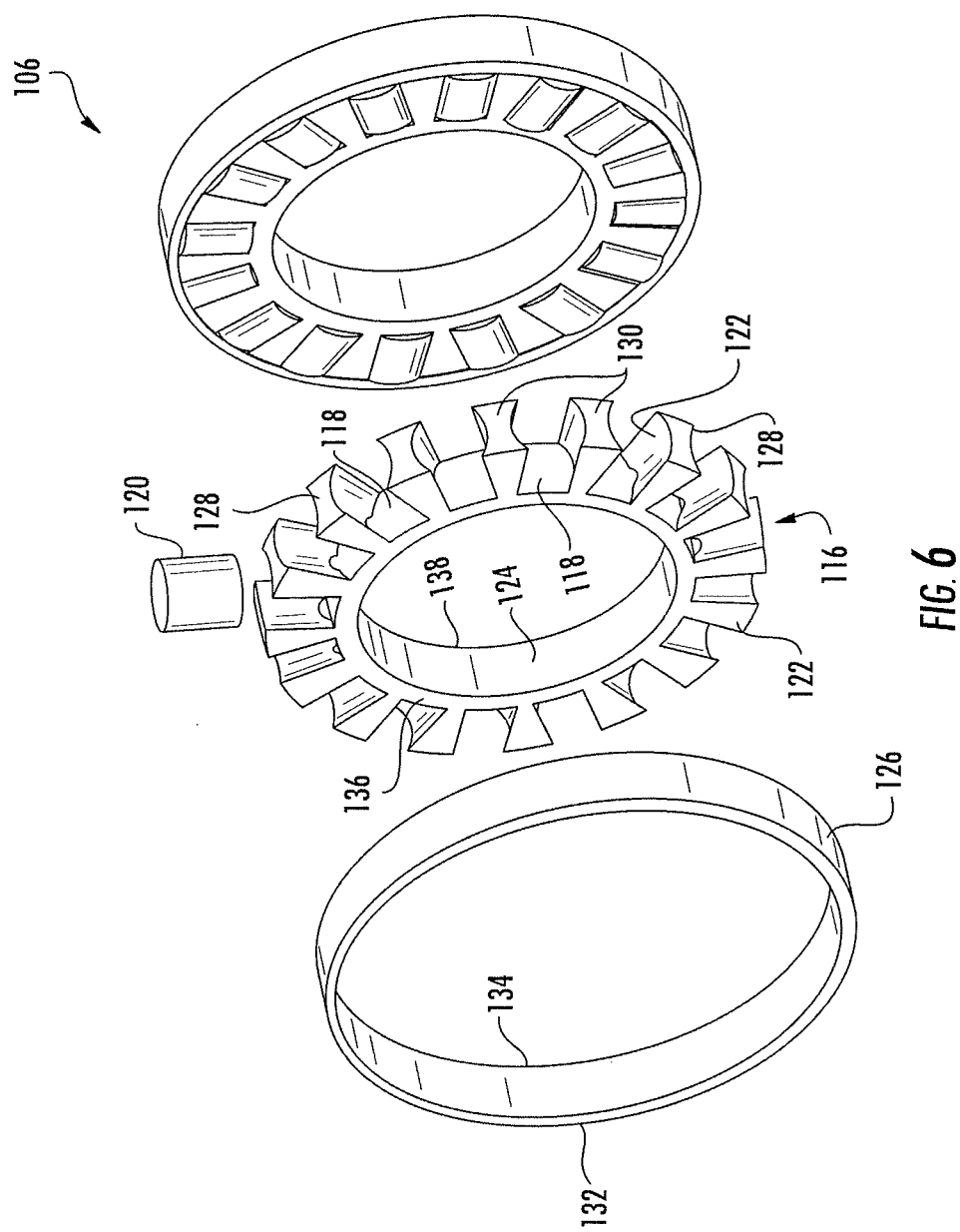
FIG. 6 is an exploded view of another portion of the downhole mud motor constructed in accordance with the present disclosure.
Figure 7:
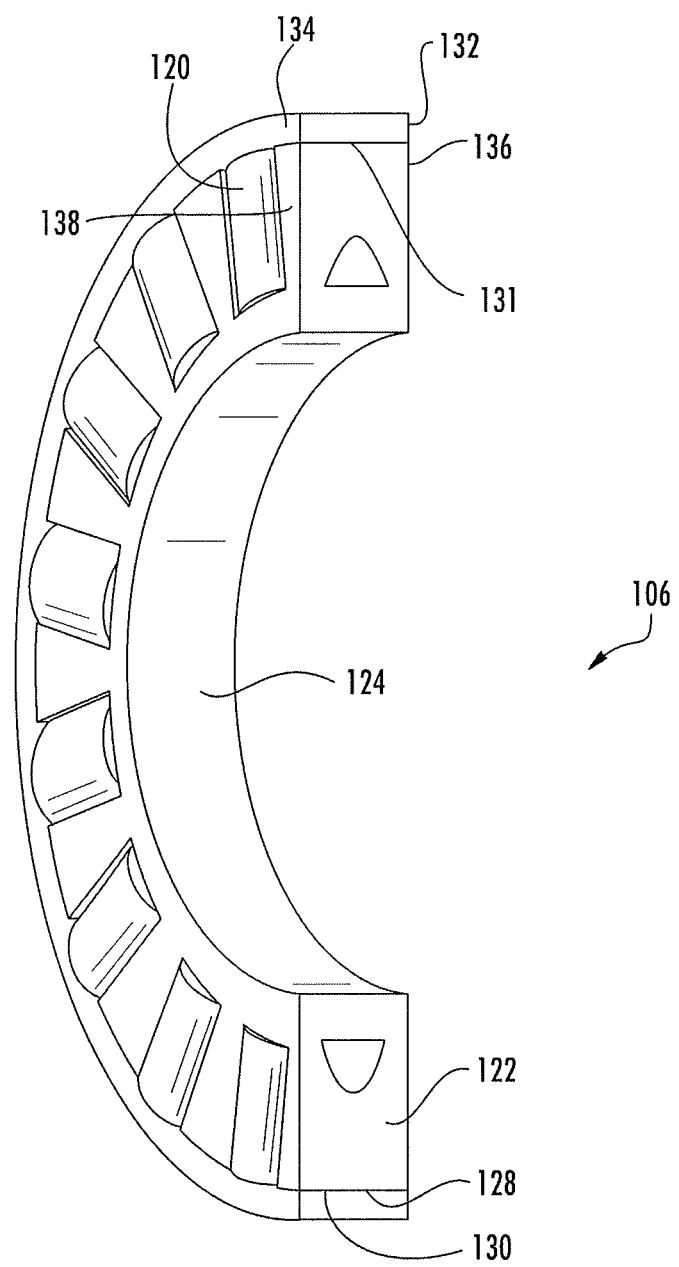
FIG. 7 is a perspective view of the portion of the downhole mud motor shown in FIG. 6 and constructed in accordance with the present disclosure.

In another embodiment shown in more detail in FIGS. 6 and 7, the lubrication fluid housing 42 includes at least one roller bearing 106 disposed about a portion of the passageway housing 24 to facilitate the rotation of the passageway housing 24 in the housing 16. The roller bearing 106 can have at least one washer element 108 disposed adjacent to each side of the roller bearing 106. In one embodiment, the housing 16 has a lip 110 extending inwardly therefrom for engaging one of the washer elements 108. The passageway housing 24 can include a shoulder 112 disposed on an outer portion 114 for engaging another washer element 108 disposed on the other side of the roller bearing 106. It should be understood that the lubrication fluid housing 42 can include multiple roller bearings 106 disposed therein to facilitate in the rotation of the passageway housing 24 in the housing 16. In one exemplary embodiment, a second roller bearing 106 is disposed on the other side of the lip 110 from the first roller bearing 106.

Each roller bearing 106 includes a roller cage 116 having a plurality of bearing seats 118 for receiving a plurality of rollers 120. The bearing seats 118 are created by extension elements 122 extending from an inner ring 124 of the roller cage 116. The extension elements 122 cooperate with each extension element 122 disposed adjacent thereto to receive the roller 120. The rollers 120 can be maintained in the bearing seats 118 by a retaining ring 126 that extends around the roller cage 116 and contacts an outer edge 128 of the roller cage 116. The outer edge 128 of the roller cage 116 is made up of each outer edge 130 of each extension element 122. In one embodiment, the rollers 120 can be cylinder-shaped.

In another embodiment of the present disclosure, the retaining ring 126 and the outer edge 128 of the roller cage 116 have a tapered interface 131. The retaining ring 126 has an inner diameter, an outer diameter, a first side 132 and a second side 134. To create the tapered interface 131, the distance from the inner diameter to the outer diameter of the retaining ring 126 increases steadily from the first side 132 of the retaining ring 126 to the second side 134. Conversely, the distance from the inner ring 122 of the roller cage 116 to the outer edge 128 of the roller cage 116 decreases steadily from a first side 136 of the roller cage 116 to a second side 138 of the roller cage 116. The tapered interface 131 permits the roller cage 116 to be removed from the retaining ring 126 to replace the rollers 124 and then put the roller cage 116 back into the retaining ring 126.

The roller cage 116, the rollers 124 and the retaining ring 126 have to be designed and constructed of materials that can withstand the varying operating conditions in downhole environments. The rollers 124, roller cage 116, and retaining ring 126 can be constructed of any metallic material known in the art that can withstand the temperature ranges faced in downhole environments. In one example, the roller cage 116 can be constructed of bronze and the retaining ring 126 can be constructed of a steel containing material.

From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A method, the method comprising:
   deploying a mud motor in a wellbore deploying a mud motor in a wellbore, the mud motor comprising:
   an outer housing having an upper portion and a lower portion;
   a power section disposed within the housing for rotating a passageway housing in response to fluid flow through the power section;
   a passageway disposed in the passageway housing where a small fluid volume is disposed in a small annulus area created between the passageway housing and the outer housing;
   a bearing assembly for facilitating the rotation of the passageway housing; and
   a hydraulic apparatus for balancing a pressure drop experienced across the bearing assembly due to frictional flow of fluid through the passageway, the hydraulic apparatus having a port radially directed in the passageway housing in fluid communication with the passageway and the small annulus area;
   flowing fluid through the mud motor to produce a rotary output from the mud motor; and
   maintaining substantially balanced pressure across sealing elements of a bearing assembly.

2. The method of claim 1 wherein the hydraulic apparatus further includes a nozzle disposed in the passageway.

3. The method of claim 2 wherein the hydraulic apparatus further includes a diffusing element disposed in the passageway and adjacent to the nozzle.

4. The method of claim 3 wherein the nozzle includes an annulus disposed thereabout, the annulus in fluid communication with the port on the side opposite from the small annulus area.

5. The method of claim 1 wherein the mud motor includes a fluid passage disposed in a lower portion of the passageway housing, the fluid passage in fluid communication with a downhole side of the bearing assembly.

6. The method of claim 1 wherein the bearing assembly includes a lubrication fluid housing, a first sealing element and a second sealing element to prevent drilling fluid from contaminating lubrication fluid in the lubrication fluid housing and lubrication fluid from leaking out of the lubrication fluid housing.

7. A method, the method comprising:
   deploying a mud motor in a wellbore, the mud motor comprising:
   a power section disposed within a housing for rotating a passageway housing, the power section having a rotor; and
   a drive shaft assembly, the drive shaft assembly comprising:
   a shaft having a first end and a second end for transferring rotation of the rotor to the passageway housing, the first end having a plurality of depression slots disposed thereon;
   a socket element supported by the rotor and adapted to receive the first end of the shaft, the socket element having a plurality of axially disposed holes therein; and
   a plurality of elongated pins, each pin having a first end and a second end, the first end of the elongated pins extend axially beyond the first end of the shaft and are disposed within the axially disposed holes in the socket element and the second end of the elongated pins engaging the depression slots disposed on the first end of the shaft; and flowing fluid through the mud motor to produce a rotary output from the mud motor.

8. The method of claim 7 wherein the drive shaft assembly further comprises a connector disposed around the shaft and threadably connected to the socket element to prevent the shaft from leaving the socket element.

9. The method of claim 8 wherein the connector is comprised of two parts.

10. The method of claim 8 wherein the drive shaft assembly further includes a retaining element attachable to the opposite side of the connector from the socket element.

11. The method of claim 7 wherein the socket element includes an extension element protruding from a central area of the socket element to engage with an opening disposed in the first end of the shaft.

12. The method of claim 7 wherein the at least one elongated pin is a cylinder.

13. A method, the method comprising:
deploying a mud motor in a wellbore, the mud motor comprising:
a roller bearing, the roller bearing comprising:
a roller cage having an inner ring, a plurality of extension elements extending therefrom and an outer edge, each pair of adjacent extension elements cooperating to form a plurality of bearing seats;
a plurality of rollers disposed in each bearing seat; and
a retaining ring disposed around the outer edge of the roller cage to maintain the rollers in the bearing seats, the retaining ring and the outer edge of the roller cage having a tapered interface from a first side of the retaining ring and the roller cage to a second side of the retaining ring and the roller cage; and
flowing fluid through the mud motor to produce a rotary output from the mud motor.

14. The method of claim 13 wherein the distance from an inner diameter and an outer diameter of the retaining ring increases from the first side of the retaining ring to the second side of the retaining ring.

15. The method of claim 13 wherein the distance from the inner ring to the outer edge of the roller cage decreases from the first side of the roller cage to the second side of the roller cage.

16. The method of claim 13 wherein the rollers are cylindrically shaped.

* * * * *